United States Patent
Hansen

[11] Patent Number: 6,102,793
[45] Date of Patent: Aug. 15, 2000

[54] VENTILATION SYSTEM

[76] Inventor: Michael Hansen, P.O. Box 3152, Sequim, Wash. 98382

[21] Appl. No.: 09/149,868

[22] Filed: Sep. 8, 1998

[51] Int. Cl.$^7$ ....................................................... F24F 11/00
[52] U.S. Cl. ............................................................... 454/342
[58] Field of Search .................................. 454/239, 253, 454/342

[56] References Cited

U.S. PATENT DOCUMENTS

| | | |
|---|---|---|
| 3,884,133 | 5/1975 | Miller . |
| 3,926,101 | 12/1975 | Moss . |
| 4,058,253 | 11/1977 | Munk et al. . |
| 4,428,278 | 1/1984 | Sutton, Jr. . |
| 4,805,835 | 2/1989 | Schaus ................................. 454/342 X |
| 4,944,216 | 7/1990 | McCutchen ............................. 454/342 |
| 4,977,818 | 12/1990 | Taylor et al. ........................... 454/342 |
| 5,178,581 | 1/1993 | Del Monte .......................... 454/342 X |
| 5,290,200 | 3/1994 | Kiser . |
| 5,292,280 | 3/1994 | Janu et al. . |
| 5,332,151 | 7/1994 | Kwak . |

FOREIGN PATENT DOCUMENTS

52-51744  4/1977  Japan ...................................... 454/342

*Primary Examiner*—Harold Joyce
*Attorney, Agent, or Firm*—Michael I. Kroll

[57] ABSTRACT

A ventilation system connected to a source of power for sensing a condition of air in an area monitored by said system and exchanging the air with fresh air upon sensing said condition. The ventilation system includes at least one strategically positioned sensor for sensing a characteristic in the air in the monitored area and comparing the characteristic to predetermined limit values and a fan for ventilating the monitored area. The fan is connected to the source of voltage by a connecting device upon a determination by the sensor that the characteristic of the sensed air exceeds the predetermined limit thereby causing the fan to remove the air within the monitored area and replace it with fresh air. The sensor senses any one of heat, smoke, carbon dioxide, carbon monoxide, hydrogen sulfide, hydrogen cyanide, any detectable gas, any emergency condition and any combination thereof. The fan is positioned within an air duct in the monitored area which leads to a position outside the monitored area. The system also includes a reset button connected to selectively disconnect the fan from the source of power.

7 Claims, 5 Drawing Sheets

FIG 5

VENTILATION SYSTEM

BACKGROUND OF THE INVENTION

1. Field of the Invention

The present invention relates generally to ventilation systems and, more specifically, to a ventilation system able to sense instances of increased heat and/or toxic substances in the air and evacuate such heated or toxic air from the structure serviced by the system.

2. Description of the Prior Art

Numerous types of ventilation systems designed to vent or exchange the internal air of a structure with external atmospheric air have been provided in the prior art. For example, U.S. Pat. Nos. 3,884,133; 3,926,101; 4,058,253; 4,428,278; 5,292,200; 5,292,280 and 5,332,151 all are illustrative of such prior art. While these ventilating systems may be suitable for the particular purpose to which they address, they would not be as suitable for the purposes of the present invention as heretofore described.

U.S. Pat. No. 3,884,133

Inventor: Edward J. Miller

Issued: May 20, 1975

A method of controlling smoke, ventilation and fire flash point temperature in a multi-zone building served by a central ventilation system uses a divided common return duct having separate branch damper connections for each zone for directing all return air from a fire zone into one section of the common return air duct for complete exhaust and for directing all return air from a non-fire zone into the other section of the common return air duct.

The method also provides positive pressurization of the non-fire ventilation zones relative to the fire ventilation zones and maximum fresh air to all zones.

U.S. Pat. No. 3,926,101

Inventor: Cyril H. Moss

Issued: Dec. 16, 1975

This invention relates to systems for clearing smoke from buildings when a fire occurs therein. Smoke detectors are provided in communal units in the building and means are provided to admit air under pressure when smoke is detected. At the same time self-closing fire-stop doors are closed to restrict passage of smoke between the communal units. When air conditioning is provided in the building by fans which admit and extract air the extraction fans are controlled by the smoke detectors so that they are reversed when smoke is detected. The speed of operation of all fans may also be increased when smoke is detected. The fans preferably draw air in through shafts which extend the full height of the building. These shafts may be constructed from a number of prefabricated units, each of which has a fan mounted thereon.

U.S. Pat. No. 4,058,253

Inventor: Munk et al.

Issued: Nov. 15, 1977

Apparatus is provided for use in the method of conserving energy by operating a ventilating and air conditioning system in a high rise building in a manner to permit operation of a heating and cooling unit at a reduced percentage of full capacity while adequately heating or cooling the atmosphere within the building. The method is accomplished by cycling area air supply and return dampers between fully-open and intermediate-open positions to selected floors or parts of floors within the building. The dampers are cyclically operated by electro-pneumatic actuators which are operatively connected to a central control apparatus for cycling according to a pre-determined pattern. Smoke detection sensors, located to sample air returned from selected areas of the building to be controlled, supply signals upon actuation by the presence of smoke to the central control apparatus which provides appropriate signals to operate dampers controlling air circulation to the areas of the building where smoke is detected, to create a positive pressure from non-smoke areas of the building toward the smoke area. The smoke is directly evacuated from the building without being re-circulated through the air circulating system and the air circulating is thereby transformed into a smoke safety, life-support system.

U.S. Pat. No. 4,428,278

Inventor: James A. Sutton Jr.

Issued: Jan. 31, 1984

An apparatus responsive to electric power failure for opening curtains or doors normally covering ventilation openings in a confinement house of the type used for raising poultry and livestock is disclosed. An electromagnet (59) is provided which is energized by the electric power supply (41) to the house (10) and is de-energized upon failure of the electric power supply (41). A pivoted metal strip (61) is normally in contact with the magnet (59) and is interconnected by means of a cord (66) with the winch (25) which is used to raise and lower the curtains (16). When the electric power (41) fails and the electromagnet (59) is de-energized, the cord (66) releases, and allows the curtains (16) to fall under their own weight. A capacitor (78) prevents de-energization of the magnet (59) when momentary power failures occur.

U.S. Pat. No. 5,292,200

Inventor: Thomas E. Kiser

Issued: Mar. 1, 1994

A system for maintaining atmospheric conditions in an enclosed building within desired parameters and rapidly evacuating abnormally high amounts of airborne pollutants from localized areas of the building. Conditioned air, including sufficient outside air, is continuously admitted to the building interior from a plurality of air handling units disposed about the building to maintain the interior of the building under a slight positive pressure throughout. The air handling units, at least in areas where concentrations of airborne contaminants are generated include, in addition to outside air and building air inlets and a building air outlet, an outlet exhausting to the outside. Sensors and/or scanning units located throughout the building monitor various atmospheric conditions and transmit signals indicative of the noted conditions to a central computer. The computer, in turn, compares the observed condition to predetermined desired conditions and controls the air handling units as necessary to maintain the conditions within desired parameters. When an abnormal airborne pollutant condition is noted in a particular area, the outside air inlet and building air outlets are closed and the building return air inlet and exhaust outlet are opened so that contaminated air is withdrawn from the region and exhausted to the outside.

U.S. Pat. No. 5,292,280

Inventor: Janu et al.

Issued: Mar. 8, 1994

An apparatus and method indirectly determines the amount of outside air introduced into the ventilation system of a structure to control the indoor air quality in the structure. Test gas concentrations, preferably carbon dioxide concentrations, are measured for return air, outside air and mixed (supply) air. The flow rate of mixed air is measured. The volume of outside air introduced into the system is determined through use of the test gas concentration measurements without directly measuring the volume or flow rate of outside air. Preferably, a single sensor is utilized to measure each of the trace gas concentrations in the return air, outside air and supply air, and the various measurements sequentially multiplexed to a controller. Moreover, for calibrating the apparatus, a return air sensor is calibrated to the outside air and a mixed air sensor is calibrated to the outside air or the return air to eliminate inaccuracy due to sensor drift.

U.S. Pat. No. 5,332,151

Inventor: Byung K. Kwak

Issued: Jul. 26, 1994

A cooling/heating apparatus having an automatic ventilating function and its method switches the ventilating function and the cooling/heating function in response to the pollution state of room air and maintains the room air in a pleasant state. The apparatus and method rotates the cooling/heating fan and the ventilating fan to be mutually supplemented and completed by the output of a gas sensor which changes its resistive value in response to the air pollution state within a room. The ventilating fan is rotated instead of said cooling/heating fan when the room air is polluted and ventilates the polluted air within a room.

SUMMARY OF THE PRESENT INVENTION

The present invention relates generally to ventilation systems and, more specifically, to a ventilation system able to sense instances of increased heat and/or toxic substances in the air and evacuate such heated or toxic air from the structure serviced by the system.

A primary object of the present invention is to provide a ventilation system that will overcome the shortcomings of prior art devices.

Another object of the present invention is to provide a ventilation system which is able to sense qualities in the air and activate the ventilation system to replace the air within the area monitored by the sensors with fresh air upon sensing an undesired quality in the air.

A further object of the present invention is to provide a ventilation system including sensors for monitoring air temperature and toxicity and replace the air when the temperature or toxicity level reaches a threshold value.

A yet further object of the present invention is to provide a ventilation system wherein the system will continue to operate replacing the air within the monitored area until either the system is reset or system power is eliminated.

A still further object of the present invention is to provide a ventilation system able to receive power from the conventional power lines in a structure being monitored and able to switch the supply of power to a backup power source upon interruption of power to the structure.

A further object of the present invention is to provide a ventilation system having an intake fan controlled by a timer and using preexisting ducts within the structure for providing fresh air to the monitored area.

Another object of the present invention is to provide a ventilation system that is simple and easy to use.

A still further object of the present invention is to provide a ventilation system that is economical in cost to manufacture.

Additional objects of the present invention will appear as the description proceeds.

A ventilation system connected to a source of power for sensing a condition of air in an area monitored by said system and exchanging the air with fresh air upon sensing said condition is disclosed by the present invention. The ventilation system includes at least one strategically positioned sensor for sensing a characteristic in the air in the monitored area and comparing the characteristic to predetermined limit values and a fan for ventilating the monitored area. The fan is connected to the source of voltage by a connecting device upon a determination by the sensor that the characteristic of the sensed air exceeds the predetermined limit thereby causing the fan to remove the air within the monitored area and replace it with fresh air. The sensor senses any one of heat, smoke, carbon dioxide, carbon monoxide, hydrogen sulfide, hydrogen cyanide, any detectable gas, any emergency condition and any combination thereof. The fan is positioned within an air duct in the monitored area which leads to a position outside the monitored area. The system also includes a reset button connected to selectively disconnect the fan from the source of power.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DETAILED DESCRIPTION OF THE PREFERRED EMBODIMENT

Turning now descriptively to the drawings, in which similar reference characters denote similar elements throughout the several views, FIGS. 2 through 5 illustrate the ventilation system of the present invention indicated generally by the numeral 10.

Figure 1:
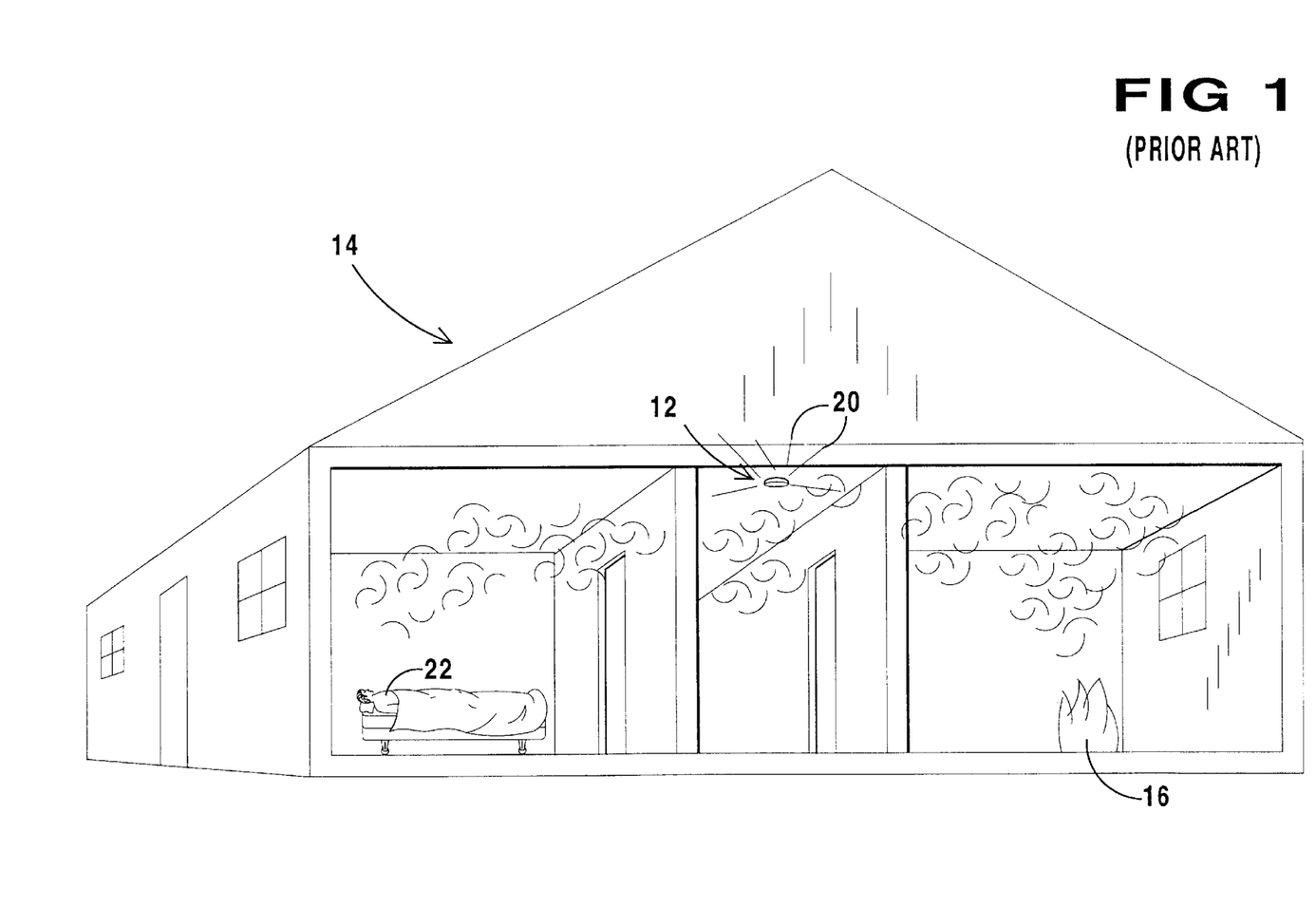
FIG. 1 is a perspective view of an edifice including a prior art smoke detector.

A prior art fire detection system 12 is shown in FIG. 1. The fire detection system 12 is positioned within a structure 14, monitoring the structure 14 for indications that a fire 16 exists therein or within a threatening distance from the structure 14. A fire 16 produces smoke 18 when burning. The smoke 18 produced is sensed by the fire detection system 12. Upon detection of a threshold amount of smoke 18, the fire detection system 12 will produce an audible alarm indicated by the lines extending from the fire detection system 12 and identified by the numeral 20. The audible alarm 20 is of a volume loud enough to alert a person 22 within the structure 14 as to the potential danger of a fire 16. Upon hearing the audible alarm 20 the person 22 will be alerted to exit the structure 14. This system 12 thus, only alerts persons 22 in the area within range of hearing the audible alarm 20 as to the potential danger. The escape of the persons 22 is aided in no other manner nor is the potential danger of the situation in no way minimized by the fire detection system 12.

Figure 2:
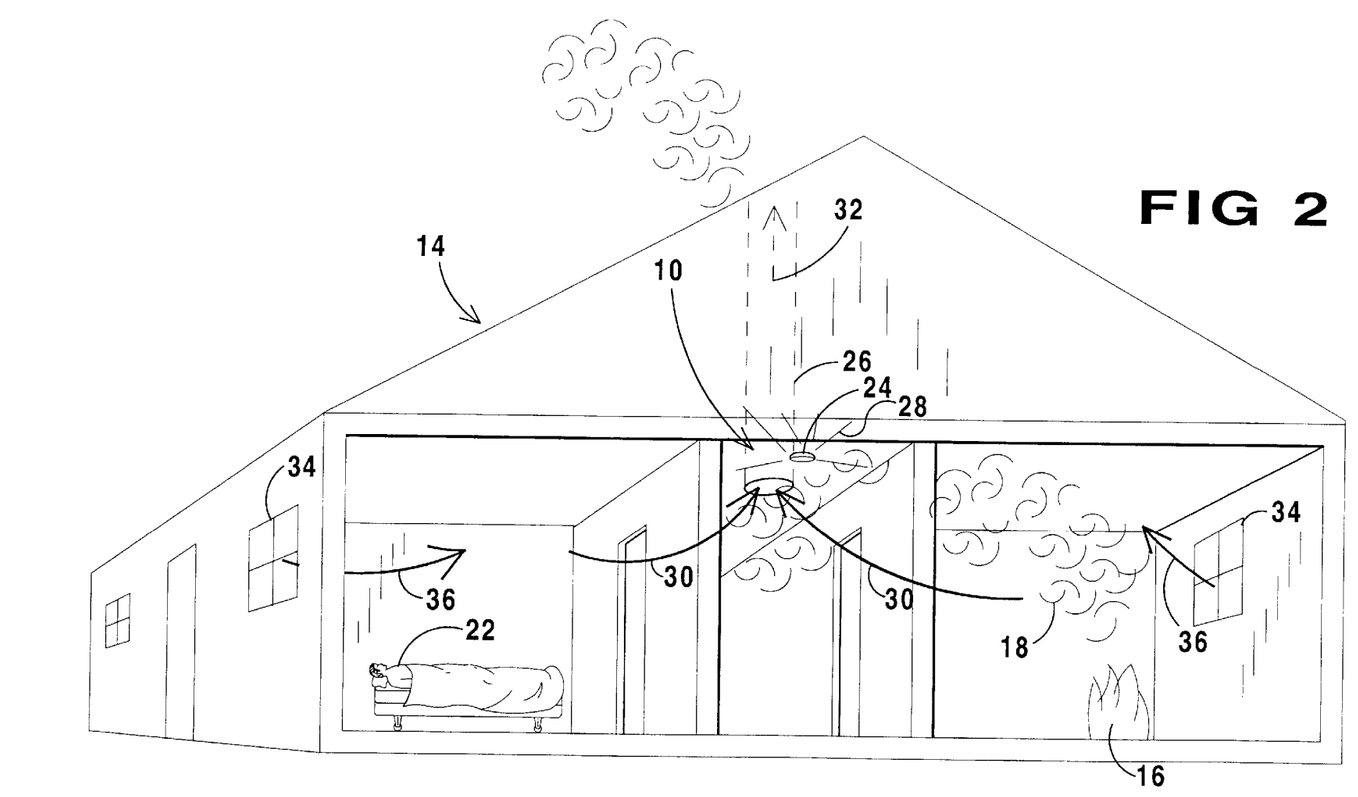
FIG. 2 is a perspective view of the ventilation system of the present invention connected within an edifice for sensing and removing smoke and super heated air caused by a fire from the edifice.

The ventilation system 10 of the present invention not only alerts persons 22 within the monitored area as to a potential danger but also aids in minimizing the potential danger. The ventilation system 10 is positioned within a structure 14 and includes a sensor 24 connected to an air duct 26. The sensor 24 senses particular desired characteristics in the air filling the monitored area and generates an audible alarm upon detecting a predetermined quality of the air representing a potentially dangerous situation. The audible alarm signal is indicated by the numeral 28. The air duct 26 extends from a position within the structure 14 to a position leading outside the structure 14 and includes a fan positioned therein. When the sensor 24 senses the air and determines a potentially hazardous situation exists such as by sensing smoke 18 from a fire 16, the fan within the air duct 26 is activated to draw the smoke 18 through the air duct 26 and out of the structure 14. The drawing of the smoke 18 into the air duct 26 is indicated by the arrows labeled 30. The smoke and polluted air drawn into the duct 26 is pulled through the duct 26 as indicated by the arrow labeled 32 and out of the structure 14. When drawing the smoke 18 and polluted air into the duct 26, the fan also acts to draw fresh air into the structure 14 through the windows 34 and other openings leading into the structure 14 as indicated by the arrows labeled 36. The fresh air drawn into the structure 14 replaces the polluted air and smoke 18 drawn through the duct 26 thereby cleaning the air within the structure 14 and cooling the inside of the structure 14.

The sensor 24 may be adapted to sense for any combination of heat, smoke, carbon dioxide, carbon monoxide, hydrogen sulfide, hydrogen cyanide and any other detectable gas or emergency condition. When the sensor 24 detects smoke or fire, the activation of the fan acts to draw the super heated air produced by the fire and smoke out of the structure 14. This not only cools the inside of the structure 14 but also clears the air within the structure 14 aiding persons therein to see where they are going. When any type of gas is being sensed by the sensor 24, the air mixed with the gas is drawn through the duct 26 and out of the structure 14. The air and gas mixture is replaced by fresh air from outside the structure 14 thereby making the structure safe for occupants or at least providing persons therein additional time to exit without possibility of harm.

The ventilation system 10 may be positioned to monitor conditions within any type of structure such as a house, office building, school, institutional building, hospital, and any other type of structure. The system may be connected to preexisting ventilation ducts or new ducts may be built into the structure. There may also be a plurality of sensors strategically positioned throughout the structure for monitoring any number of conditions throughout the structure 14. The sensors 24 are strategically positioned to maximize the ability of the system 10 to detect any type of potentially dangerous situation.

Figure 3:
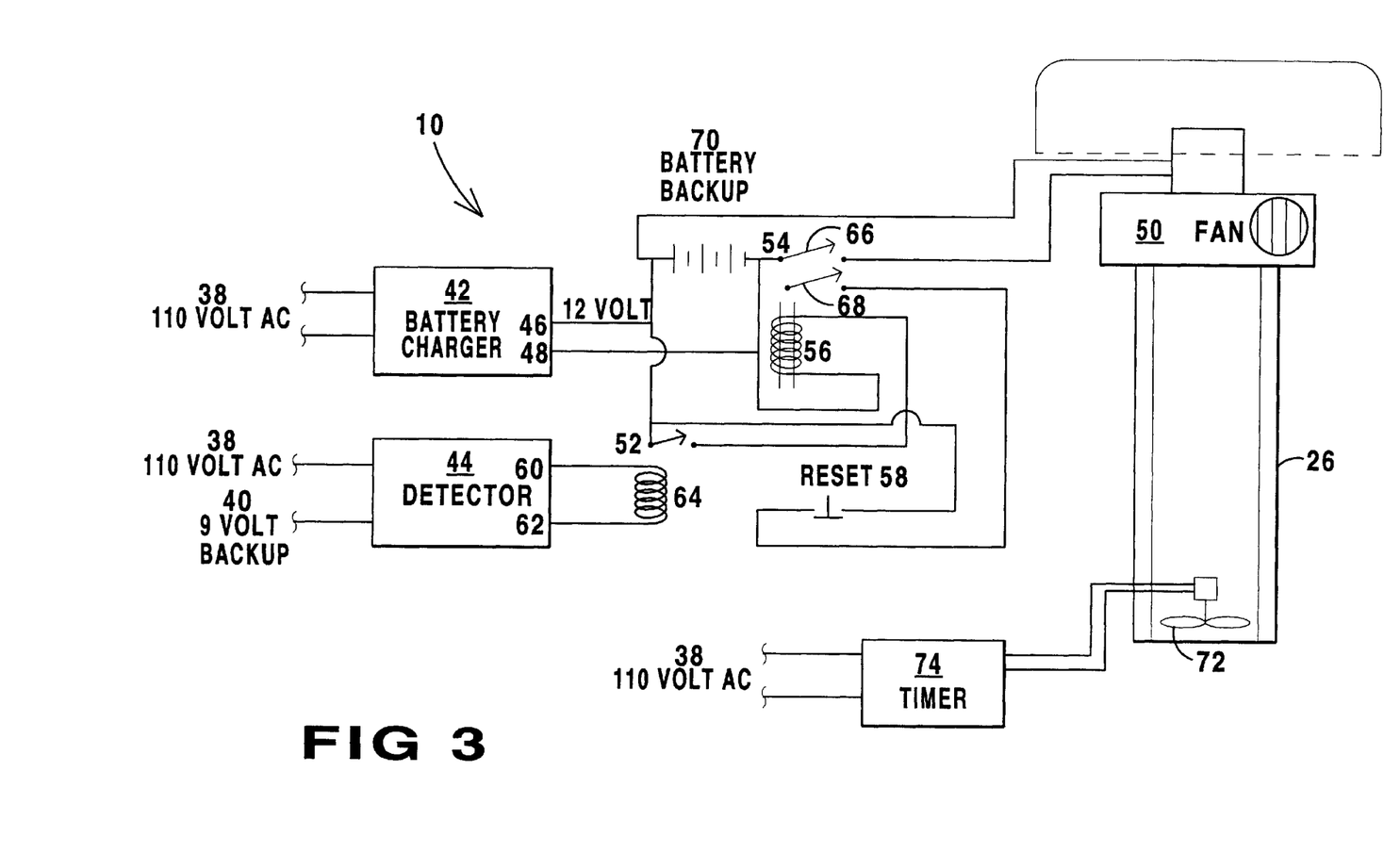
FIG. 3 is a schematic diagram of the ventilation system of the present invention.

The schematic block diagram of the ventilation system 10 is illustrated in FIG. 3. This figure illustrates the system 10 connected to an AC power source 38 of the structure. The AC power source 38 is connected to both a battery charger 42 and to a detector unit 44. The battery charger 42 includes a first positive terminal 46 and a second negative or ground potential terminal 48. The first positive terminal 46 is connected to supply 12 volts to a first terminal of a first fan 50 and is also connected to a first terminal of a first switch 52. The second terminal 48 is connected to a first terminal of a second switch 54, a first terminal of a first inductor 56 and a first terminal of a reset switch 58.

The second switch 54 is a double contact switch including a first contact 66 and a second contact 68. The first contact 66 selectively connects a second terminal of the first fan 50 to the second terminal 48 of the battery charger 42 to complete the circuit and turn on the first fan 50. The second contact 68 is connected to a first terminal of the reset switch 58. When the reset switch 58 is activated, it will interrupt the flow of power to the first inductor 56 thereby causing the first and second contacts 66 and 68 to open. The opening of the first and second contacts disconnects the first fan 50 from the battery charger 42 thereby interrupting the flow of power to the first fan 50.

The detector 44 includes first and second terminals 60 and 62, respectively. The first and second terminals 60 and 62 of the detector 44 are connected across a second inductor 64. The second inductor 64 controls switching of the first switch 52 when a power is provided thereacross. The closing of the first switch 52 connects the first inductor 56 across the first and second terminals 46 and 48 of the battery charger 42 causing the first inductor 56 to close the first and second contacts 66 and 68 of the second switch 54. When the first contact 66 of the second switch 54 is closed, power is provided to activate the first fan 50. The first positive terminal 46 of the battery charger 42 is disconnected from the first inductor 56 when the reset button 58 is activated. This causes the first and second contacts 66 and 68 to open and disconnect the supply of power to the first fan 50.

Also connected to supply power to the detector 44 is a backup battery 40. The backup battery 40 allows for the detector 44 to continue to work when the AC power source 38 of the structure fails. A second backup battery 70 is connected between the first positive terminal 46 of the battery charger 42 and the first contact 66 of the second switch 54. The battery charger 42 continually charges the backup battery 70 allowing the second backup battery 70 to provide power to the first fan 50 when the AC power source 38 fails. Thus, the first fan 50 is able to continually draw smoke and polluted air from the structure after the AC power source 38 of the structure is interrupted or damaged due to the sensed hazardous situation.

A second fan 72 is normally positioned within the existing duct 26. The second fan 72 is provided to regulate the conditions within the structure and in many areas is required under local building code ordinances. The second fan is normally connected to the AC power source 38 of the structure via a timer mechanism 74 or temperature sensor.

The time mechanism 74 connects the second fan 72 to the AC power source of the structure at predetermined intervals or when the air temperature falls below a predetermined desired level. This acts to keep the temperature and climate within the structure at a desired and comfortable level.

Figure 4:
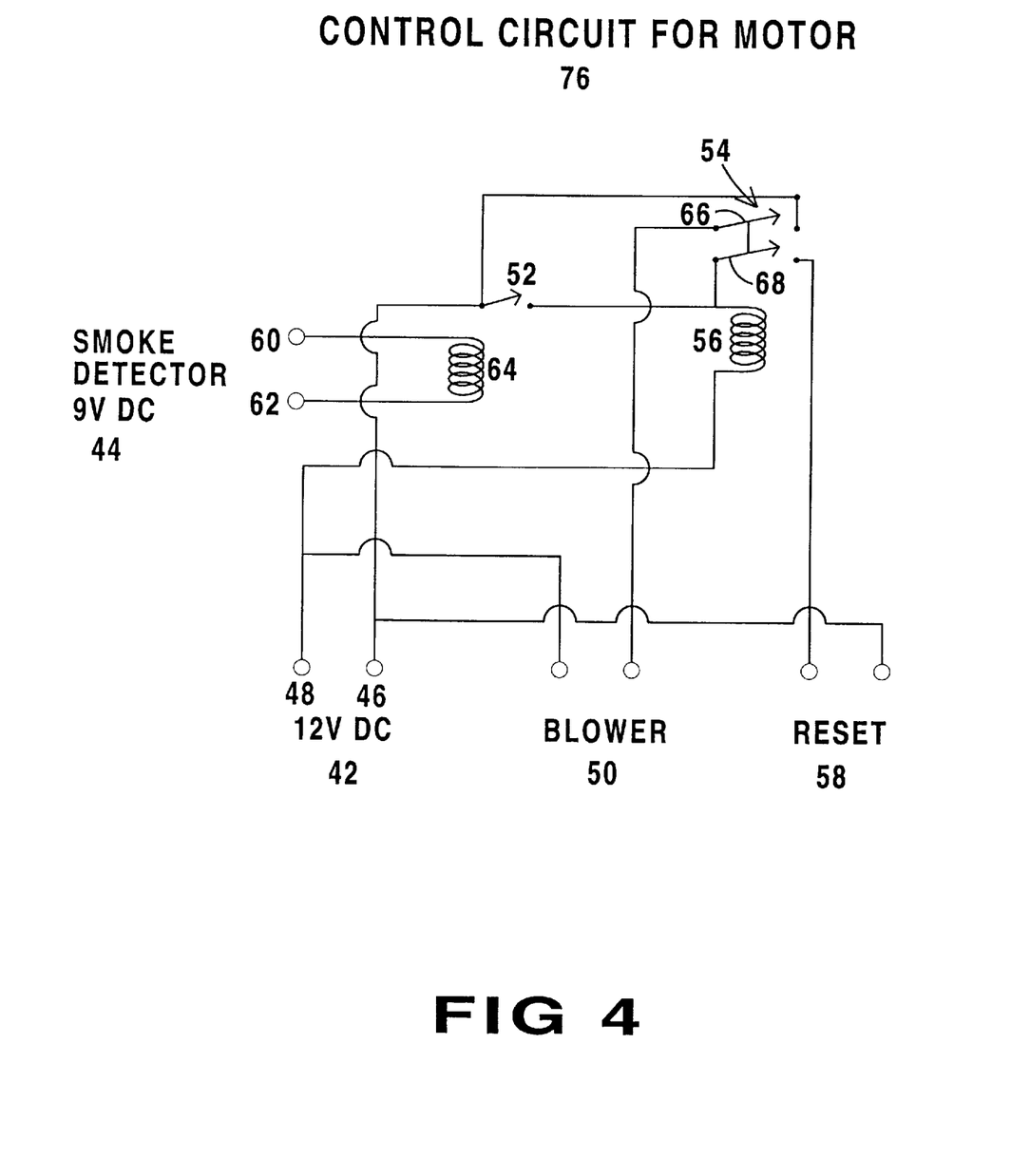
FIG. 4 is a schematic diagram of the control circuit for the exhaust fan of the ventilation system of the present invention.

FIG. 4 is a schematic diagram of the control circuit 76 for connecting the first fan 50 to the AC power source 38. As can be seen from this figure the detector 44 includes first and second terminals 60 and 62, respectively. The first and second terminals 60 and 62 of the detector 44 are connected across a second inductor 64. The second inductor 64 controls switching of the first switch 52 when a power is provided thereacross. A 12 volt DC power source includes a first terminal 46 connected to one terminal of the first inductor 56 via the first switch 52 and to an output of the second switch. The second terminal of the 12 volt DC source 42 is connected to the other terminal of the first inductor 56.

When the detector 44 senses an emergency situation a voltage is applied across the second inductor 64 causing the first switch 52 to close. The closing of the first switch 52 connects the first inductor 56 across the first and second terminals 46 and 48 of the 12 volt DC power source 42 causing the first inductor 56 to close the first and second contacts 66 and 68 of the second switch 54. The closing of the first contact 66 of the second switch 54 provides power to activate the first fan 50.

Activation of the reset switch 58 interrupts power to the fan and causes the first positive terminal 46 of the 12 volt power source 42 to be disconnected from the first inductor 56. This causes the first and second contacts 66 and 68 to open and disconnect the supply of power to the first fan 50. Disconnection of the power supply from the first fan 50 causes the first fan 50 to turn off.

Figure 5:
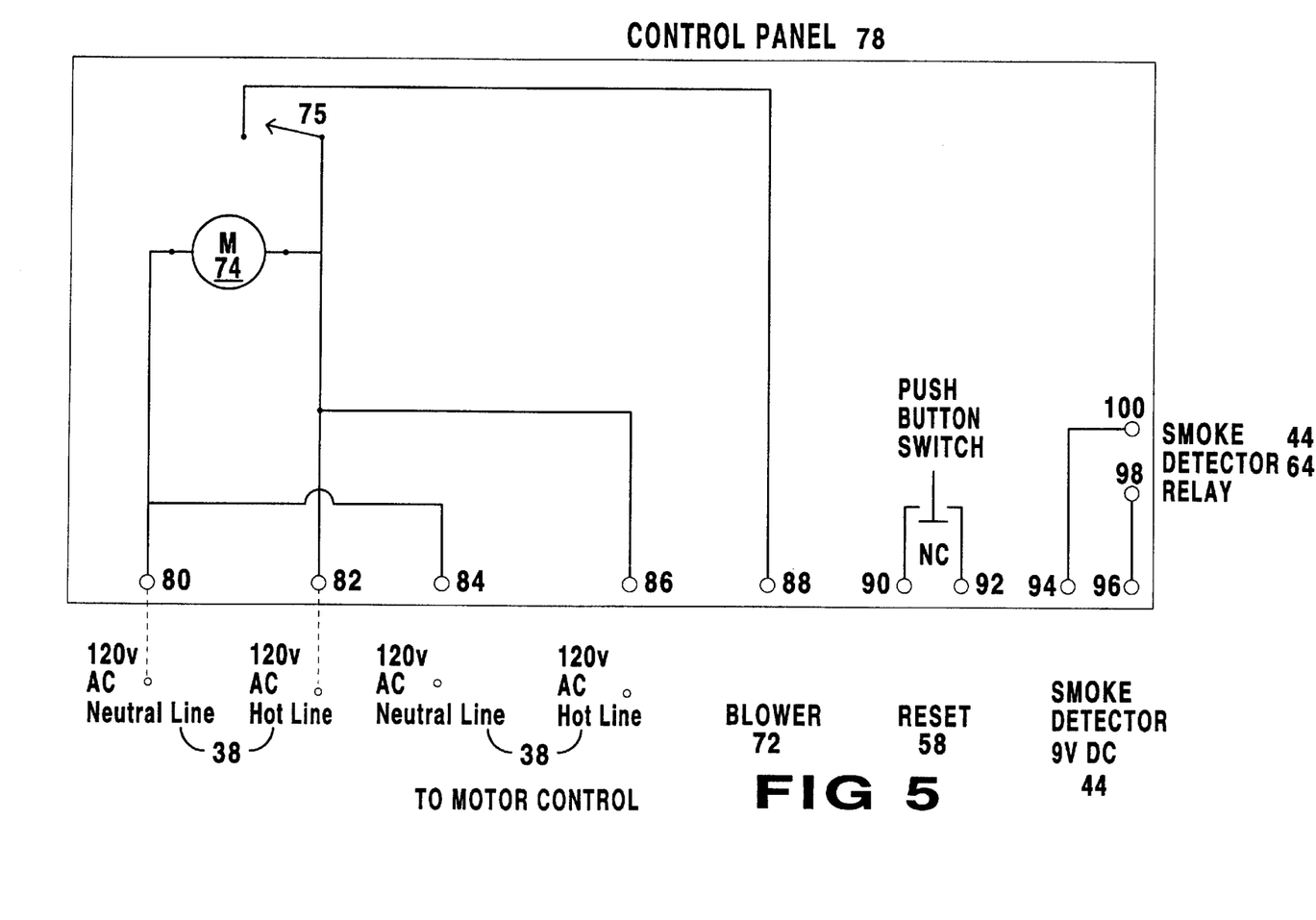
FIG. 5 is a schematic diagram of the control panel of the ventilation system of the present invention.

FIG. 5 illustrates a schematic diagram of the control panel 78 of the ventilation system 10. The control panel 78 provides a circuit for connecting the elements of the ventilation system 10 of the present invention. The control panel 78 includes a first terminal 80 for connection to the 120 volt AC power source neutral line and a second terminal 82 for connection to the 120 volt AC hot line. A third terminal 84 is connected to the 120 volt AC power source neutral line and a fourth terminal 86 is connected to the 120 volt AC hot line. The first and second terminals 80 and 82 are connected across the timer circuit 74 for controlling the operation of the second fan 72. The third and fourth terminals 84 and 86 are also connected across the timer circuit 74. The timer circuit 74 controls a third switch 75 for applying power to and activating the second fan 72. A fifth terminal 88 connects the second switch 54 to the blower 50. A sixth terminal 90 and a seventh terminal 92 are connected across the reset button 58. An eighth terminal 94 and ninth terminal are connected to the backup battery 40 for the detector 44. A tenth and eleventh terminal 98 and 100, respectively, are connected to the smoke detector relay/inductor 64. The eighth terminal 94 is connected to the eleventh terminal 100 and the ninth terminal 96 is connected to the tenth terminal 98. By connecting the elements to the correct terminals of the control circuit 78, the ventilation system 10 will operate as shown in FIG. 3. The reset button 58 is provided to extend from the control panel 78 in an easily accessible position so that it may be readily activated to turn off the ventilation system when desired.

The operation of the ventilation system 10 will now be described with reference to the figures. In operation, the ventilation system 10 is connected as illustrated in FIGS. 3 and 5. The first fan is connected within the air duct 26 of the structure 14. The detector(s) are connected to both the AC voltage source 38 and the backup battery 40 and strategically positioned around the structure 14. The control circuit 76 is connected between the AC power source 38 of the structure 14 and the first fan 50. The detector(s) 44 are connected to control the first switch 52 and the relay switch is connected between the first switch and the second switch. The ventilation system 10 is now connected and ready to begin monitoring the structure or desired area.

At this point, the first and second switches are in a normally open position disconnecting the first fan 50 from the power sources 38 and 70. The detector is monitoring the desired area for detecting any one of a number of potentially hazardous situations. Such situations include but are not limited to any combination of heat, smoke, carbon dioxide, carbon monoxide, hydrogen sulfide, hydrogen cyanide and any other detectable gas or emergency condition. The second fan 72 is operating to maintain desired atmospheric conditions within the structure 14.

When the detector 44 senses a hazardous or potentially hazardous condition, a voltage is applied across the terminals of the first inductor 64. This causes the first switch to close and connect the 120 volt AC power source 38 across the terminals of the second inductor 56. The second inductor 56 causes the contacts 66 and 68 of the second switch 54 to close and thus apply a voltage to the first fan 50. The first fan 50 is now caused to turn on and draw the polluted air and/or smoke within the structure up through the duct 26. The first fan 50 also acts to replace the polluted air with fresh air drawn in through the windows and vents of the structure 14. The first fan 50 will continue to run, receiving power from the backup battery 70 after the 120 volt power supply 38 fails. The first fan 50 continues to run until the reset button 58 is pressed. At this time power is cut off to the second inductor 56 causing the second switch to open and interrupt the flow of power to the first fan.

From the above description it can be seen that the ventilation system of the present invention is able to overcome the shortcomings of prior art devices by providing a ventilation system which is able to sense air qualities and actuate the ventilation system to replace the air within the area monitored by the sensors with fresh air upon sensing an undesired quality in the air, the sensors monitoring air temperature and toxicity and replacing the air when the temperature or toxicity level reaches a threshold value. The ventilation system continues to operate replacing the air within the monitored area until either the system is reset or system power is eliminated, receiving power from the conventional power lines in a structure being monitored and able to switch the supply of power to a backup power source upon interruption of power to the structure. The ventilation system also includes an intake fan controlled by a timer and using preexisting ducts within the structure for providing fresh air to the monitored area. Furthermore, the ventilation system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A ventilatiion system connected to a source of power for sensing a desired characteristic of air in an area monitored by said system, said ventilation system comprising:
   a) means strategically positioned within the area to be monitored for sensing the desired characteristic of air in the area monitored by said system and comparing the sensed air to predetermined limit values;
   b) means for ventilating the area monitored by said system comprising a first fan positioned within an air duct in the monitored area, said air duct leading from within the monitored area to a position outside the monitored area;
   c) means comprising a first switch and a second switch inductively coupled to said first switch connected between said sensing means and said first fan for connecting said first fan to the source of power upon determination by said sensing means that the desired characteristic exceeds said predetermined limit value causing said ventilating means to remove the air within the monitored area, the closing of said first switch causing the closing of said second switch, said second switch being a double contact switch with a first contact thererof making the connection to said first fan;
   d) a first backup power source connected to said first switch for supplying power to said first fan when the source of power is interrupted and a battery charger for charging said first backup power source;
   e) means connecting said sensing means to receive power from the source of power and a second backup power source connected to said sensing means for providing power to said sensing means when the source of power is interrupted;
   f) a second fan positioned within the duct downstream of said first fan for controlling a climate within the area to be monitored; and
   g) reset switch means connected through a second contact of said second switch for interrupting the inductive coupling between said first and second switches to disconnect said first fan from said source of power when said reset switch means is closed.

2. The ventilation system as recited in claim 1, wherein said ventilating means replaces the air within the monitored area with fresh air.

3. The ventilation system as recited in claim 1, wherein said sensing means senses any one of heat, smoke, carbon dioxide, carbon monoxide, hydrogen sulfide, hydrogen cyanide, any detectable gas, any emergency condition and any combination thereof.

4. The ventilation system as recited in claim 1, wherein said sensing means includes a plurality of detectors.

5. The ventilation system as recited in claim 4, wherein each of said plurality of detectors monitors a different characteristic of the air within the area to be monitored.

6. The ventilation system as recited in claim 1, wherein the area to be monitored is a structure and the source of power is the power source within the structure.

7. The ventilation system as recited in claim 6, wherein the structure is one of a house, office building, school, institutional building and hospital.

* * * * *